US006977358B2

(12) United States Patent
Albrecht et al.

(10) Patent No.: US 6,977,358 B2
(45) Date of Patent: Dec. 20, 2005

(54) WELDER WITH INTEGRATED GAS BOTTLE

(75) Inventors: Bruce Albrecht, Hortonville, WI (US); Ken Stanzel, Appleton, WI (US); Bernard J. Vogel, Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 169 days.

(21) Appl. No.: 10/604,237

(22) Filed: Jul. 2, 2003

(65) Prior Publication Data

US 2005/0000946 A1    Jan. 6, 2005

(51) Int. Cl.[7] .................................. B23K 9/16
(52) U.S. Cl. ..................... 219/130.1; 219/74
(58) Field of Search ................. 219/130.1, 136, 219/74, 75

(56) References Cited

U.S. PATENT DOCUMENTS 3,458,681 A * 7/1969 Forrester ..................... 219/74
4,521,672 A * 6/1985 Fronius ................. 219/130.51
5,472,024 A   12/1995 Brugerolle et al.
6,225,596 B1 * 5/2001 Chandler et al. ........ 219/130.1

FOREIGN PATENT DOCUMENTS

| DE | 2650522 A | * | 5/1978 |
| DE | 83 08 999.3 U | | 11/1983 |
| JP | 53-67657 A | * | 6/1978 |
| JP | 60-64769 A | * | 4/1985 |
| SU | 245241 | * | 11/1969 |

OTHER PUBLICATIONS

English language translation of previously cited Japanese document No. JP60-64769A.*

* cited by examiner

*Primary Examiner*—Clifford C. Shaw
(74) *Attorney, Agent, or Firm*—Ziolkowski Patent Solutions Group, SC

(57) ABSTRACT

A welder having an integrated gas cylinder is disclosed. The welder has a power source constructed to condition and output an electrical signal suitable to welding and a gas cylinder disposed in an enclosure.

32 Claims, 2 Drawing Sheets

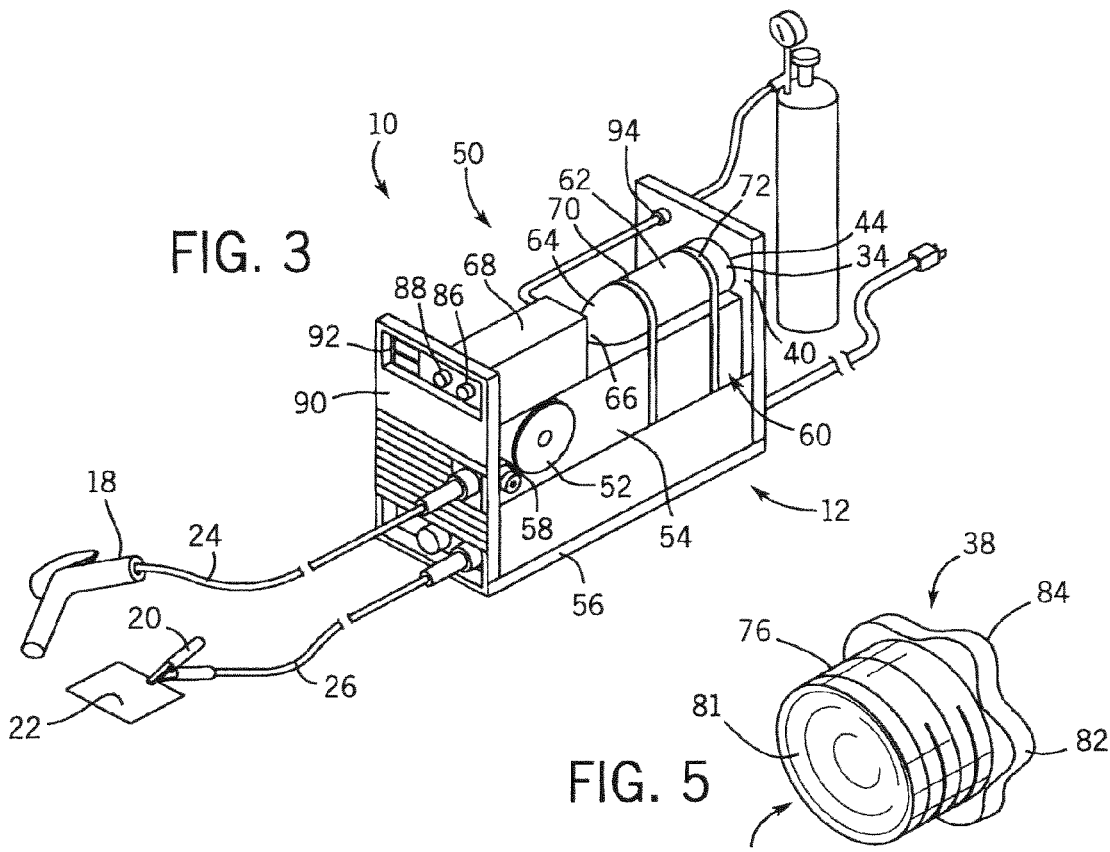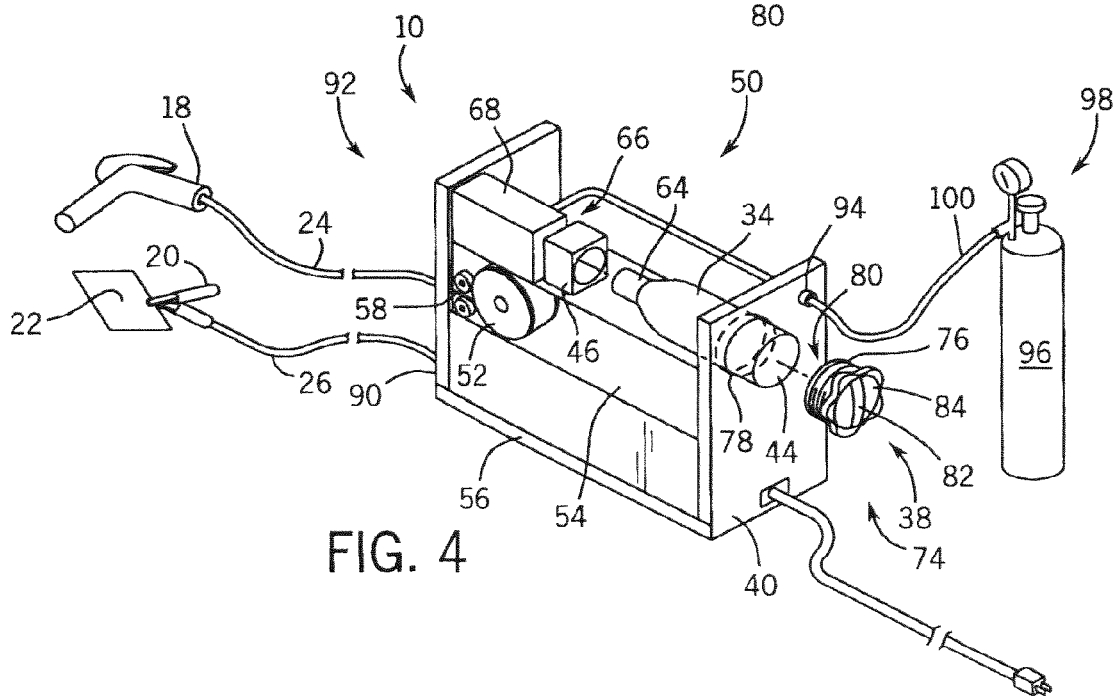

WELDER WITH INTEGRATED GAS BOTTLE

BACKGROUND OF INVENTION

The present invention relates generally to welding systems and, more particularly, to a welder having an integrated gas cylinder.

Welder power sources have become increasingly portable in recent years. This portability is largely the result of lighter unit weight and improved electrical components. One advancement in the area of electrical components has been the incorporation of inverter-type power sources. The application of an inverter power source has reduced the size and weight of welders and created usable space within the confines of the housing, while maintaining the ability to generate the outputs required for welding. Similarly, advances in battery technology allow the incorporation of an energy storage device in a welder to allow easy transport.

Improvements in wire feeder technology have also improved the ease of use and portability of a welder. Wire welding is generally believed to be easier to learn than conventional stick welding and as such, relatively inexperienced artisans can produce adequate results in relatively little time. As a result, due to the ease of use and versatility of application, many users prefer wire welding over conventional stick welding.

Space in any work environment is always at a premium. Whether the welder is used in the hobbyist's garage or the machine shop of an industrial plant, the size of the unit is always a design consideration. The space used by a welder is not limited to the dimensions of the power source itself but includes the ancillaries related to welding processes such as cables, consumables, and gas cylinders. The space required for the storage and maintenance of these items is another consideration associated with many welders.

Shielding gas cylinders provide gas to the welding process. This gas essentially encapsulates the welding process in order to protect the integrity of the weld from contaminants and also enhances arc performance during a welding process. The shielding gas is generally provided in very large and very heavy cylinders. The cylinders are constructed ruggedly to withstand the high pressure of the gas contained therein and the rigors of the workplace. A regulator is typically attached to the gas cylinder and allows the operator of the welding power source to control the amount of gas supplied to the welding process.

The size and weight of the gas cylinders significantly detracts from the portability of the welder. Additionally, attempts to move the welder and gas cylinder together presents an opportunity for inadvertent damage to the gas cylinder or to the regulator attached thereto unless a large cart is provided. Such carts however are large and typically constructed to accommodate large gas cylinders. Such construction generally results in a large and cumbersome device that is still difficult to maneuver in confined quarters.

It would therefore be desirable to design a system and method capable of generating the power necessary for welding having a housing that incorporated a gas cylinder and/or regulator all enclosed within the housing of the welder.

BRIEF DESCRIPTION OF INVENTION

The present invention is directed to a welding system that solves the aforementioned drawbacks. The present invention provides a system and method for a welder that is portable and includes a shielding gas cylinder therein.

Therefore in accordance with one aspect of the present invention, a welding-type apparatus is disclosed having a power source constructed to condition and output an electrical signal suitable to welding located in an enclosure. A gas cylinder is disposed within the enclosure and provides shielding gas for welding. As such, the enclosure completely encloses the gas cylinder thereby providing convenient storage for the gas cylinder and regulator.

In accordance with another aspect of the present invention, a welder is disclosed having a power source configured to generate welding-type power and deliver the power to a welding gun that is in electrical communication therewith. A gas cylinder is disposed within the power source and connected thereto so that the cylinder supplies gas to the welding gun and is enclosed by the housing of the welder.

In accordance with a further aspect of the present invention, a method of constructing a welding-type apparatus is disclosed that includes positioning a power source with respect to a base of the apparatus, providing a restraining system to hold a gas cylinder relative to the power source, and forming a housing to enclose both the power source and the restraining system. As such, both the power source and the restraining system are enclosed by the housing.

In accordance with yet another aspect of the present invention, a welder-type device is presented having a housing with an opening to allow passage of a gas cylinder therethrough. The welder-type device has a means for supplying welding power and a means for retaining a gas cylinder within the housing. Therefore, a gas cylinder positioned within the housing can be securely fastened thereto.

Therefore, the present invention provides a welder power source with a gas cylinder housed therein. Such a construction allows for a welder power source that is lightweight and transportable with a gas cylinder securely housed therein.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings:

FIG. 3 is a perspective view of the power source of FIG. 1 with the cover removed.

FIG. 4 is a perspective rear-side view of the of the power source of FIG. 2 with the cover removed.

FIG. 5 is a perspective view of the cover of an opening for the gas cylinder of the power source of FIGS. 2 and 4.

DETAILED DESCRIPTION

As one skilled in the art will fully appreciate the hereinafter description of welding devices not only includes welders but may also include any system that requires high power outputs, such as heating and cutting systems that require gas cylinders. Therefore, the present invention is equivalently applicable with any device requiring high power output in conjunction with a gas cylinder system, including welders, plasma cutters, heaters, and the like. Reference to welding power, welding-type power, or welders generally, includes welding, cutting, or heating power. Description of a welding apparatus illustrates just one embodiment in which the present invention may be implemented. Understandably, the present invention is equivalently applicable with other systems, such as for cutting and heating.

Figure 1:
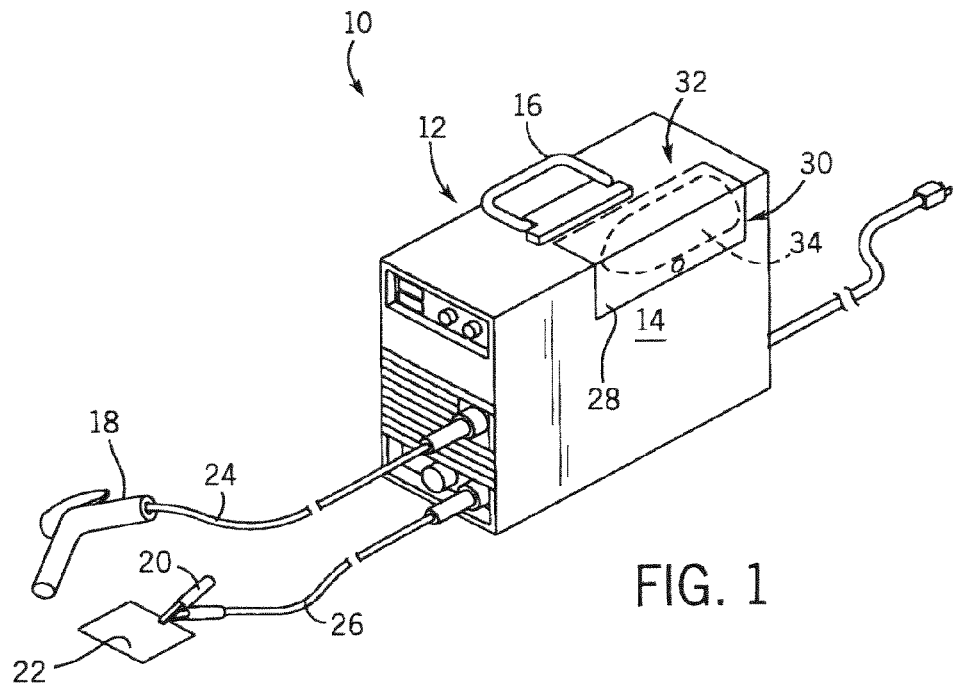
FIG. 1 is a front-side perspective view of a welder according to the present invention.

Referring now to FIG. 1, a perspective view of a welding device incorporating the present invention is shown. Welding device 10 includes a housing 12 enclosing the internal components of the welding device under a cover 14. Optionally, the welding device 10 includes a handle 16 for transporting the welding system from one location to another. To effectuate the welding process, such as TIG or MIG welding, the welding device includes a torch 18 as well as a work clamp 20. The work clamp 20 is configured to ground a workpiece 22 to be welded. As is known, when the torch 18 is in relative proximity to workpiece 22, a welding arc or cutting arc results, depending upon the particular welding desired. A pair of cables 24 and 26 connects the torch 18 and work clamp 20 to the housing 12, respectively.

As shown in FIG. 1, cover 14 has a door 28 located therein which allows access to an interior of welding device 10. Door 28 covers an opening 30 in housing 12 and has a hinge 32 connecting door 28 thereto. Opening 30 is configured to allow for the passage of a gas cylinder 34 (shown in phantom under cover 14) therethrough. Hinge 32 of door 28 allows door 28 to be pivotally opened and closed over opening 30. The hinge may also be placed on a bottom side 36 of the door 28.

Figure 2:
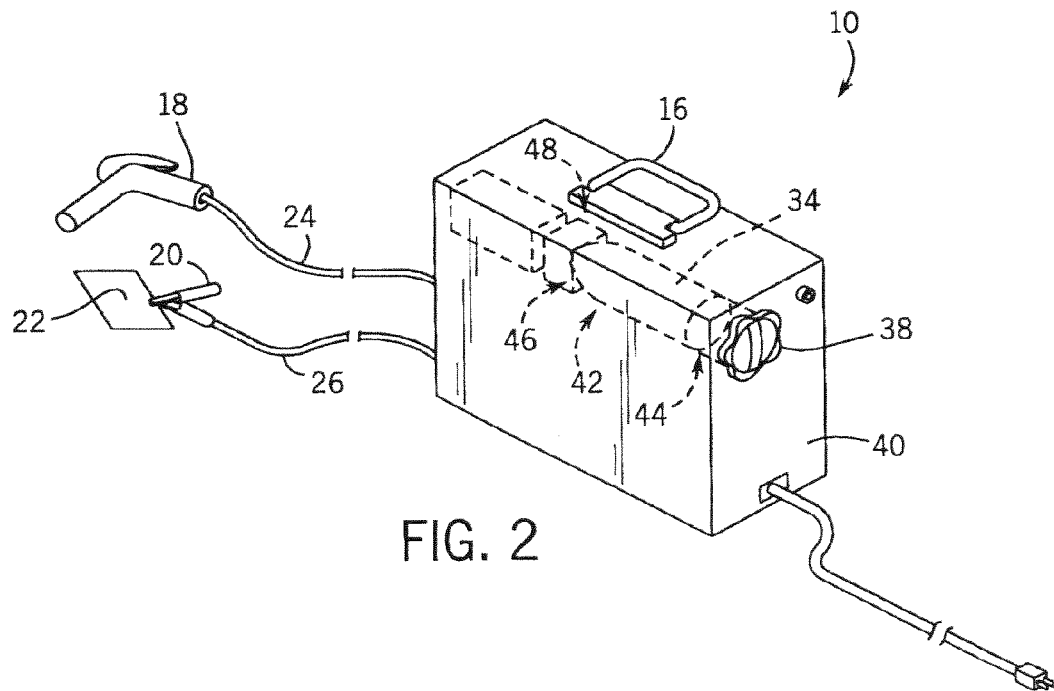
FIG. 2 is a rear-side perspective view of the welder of FIG. 1 having an alternate housing attached thereto.

FIG. 2 shows an alternate embodiment of the opening for the gas cylinder 34. Preferably, a cover 38 is threadingly engaged to a rear panel 40 of housing 12. Cover 38 is removable to allow for placement of a gas cylinder 34 into a gas cylinder chamber 42. Cover 38 can be constructed to retain a base 44 of the gas cylinder 34. In this manner, a support 46 is provided at a front end 48 of gas cylinder chamber 40 and gas cylinder 34 is effectively retained between support 46 and cover 38. Although shown as positioned in a rear or a side panel of the housing, such openings are only by way of example and do not limit the scope of the claims presented herein.

FIG. 3 shows a detailed view of the embodiment of FIG. 1 with cover 38 moved to expose an interior 50 of welding device 10. A wire feeder 52 is disposed in interior 50 of welding device 10 and in electrical communication with a power source 54, also located therein and attached to a base 56 of housing 12. Wire feeder 52 provides a consumable material, such as wire 58, to torch 18 during the welding process. Shielding gas is also provided to torch 18 during the welding process from gas cylinder 34.

Gas cylinder 34 is located within housing 12 of welding device 10 and held in place by a means for retaining the gas cylinder, in this embodiment, a restraint 60. Restraint 60 maintains the position of gas cylinder 34 relative to power source 54. A body 62 extends from base 44 of gas cylinder 34 to an outlet end 64. Outlet end 64 of gas cylinder 34 is constructed to engage a first adapter 66 of a regulator 68. The means for retaining 60 can be of many different configurations such as that shown with reference to FIGS. 4 and 5, as will be discussed below, or, as that shown in FIG. 3, a pair of straps 70, 72 that hold body 62 of gas cylinder 34 and prevents movement of gas cylinder 34 relative to power source 54. Such a construction prevents the inadvertent disengagement of gas cylinder 34 from first adapter 66 of regulator 68.

The second embodiment of the means for retaining is shown in FIG. 4. Cover 38, also shown in FIG. 5, extends into interior 50 of welding device 10 extending past rear panel 40. Cover 38 is constructed to engage base 44 of gas cylinder 34 and thereby create a compressive force 74 between support 46 and rear panel 40 of housing 12 with gas cylinder 34 disposed therebetween. The construction of support 46 and cover 38 secure gas cylinder 34 relative to power source 54 within housing 12 of welder 10. Regardless of which embodiment is applied, gas cylinder 34 is located within a perimeter of housing 12 and held securely therein.

Also shown in FIGS. 3 and 4, first adapter 66 of regulator 68 is constructed to engage outlet end 64 of gas cylinder 34 inside housing 12 and still allow user control over the function of the regulator. A dial 86 and/or a pressure gauge 88 extend from regulator 68 through a front panel 90 of housing 12. Dial 86 and/or pressure gauge 88 allow a user to adjust and determine a delivery pressure of shielding gas to torch 18 from gas cylinder 34. Dial 86 and pressure gauge 88 are positioned in a control area 92 of front panel 90 so that a majority of the controls of the welding device are adjustable from a control area 92 of device 10. In addition to first adapter 66 of regulator 68, regulator 68 also has a second adapter 94, which is discussed below.

As shown in FIGS. 4 and 5, cover 38 has a threaded section 76 that engages a threaded opening 78 in rear panel 40. Threaded opening 78 is sized to accommodate the passage of gas cylinder 34 therethrough. An inner surface 80 of cover 38 is constructed to engage base 44 of gas cylinder 34 and includes a pad 81 attached thereto. A plurality of protrusions 82 extend from an outer surface 84 of cover 38 and allows a user to turn cover 38 into threaded engagement with rear panel 40 without additional tools. It is understood that protrusion 82 could be any shape desired, or even a recess into cover 38, and constructed to engage a driving tool.

Second adapter 94 extends from regulator 68 through rear panel 40 and is constructed to engage a bulk cylinder 96. Bulk cylinder 96 also has a regulator 98 attached thereto. A connection means 100 extends from regulator 98 to second adapter 94 of welding device 10. As such, regulator 68, which is, in part, located in control area 92 of front panel 90 is constructed to control the flow of shielding gas from either gas cylinder 34 and/or bulk cylinder 96. This construction provides for the connection of a second gas cylinder to the welding device when desired, such as when the welder is located at a primary operating position such as a shop or a garage. Additionally, this construction provides that the gas cylinder located within the welding device is reserved for remote operations away from the bulk tank. The construction also prevents excessive changing of gas cylinders when a bulk cylinder is available. Additionally, the user is not required to transport a heavy and awkward bulk cylinder but can simply disconnect the bulk cylinder at second adapter 94 and move the welder to a desired position with gas cylinder 34 located securely within housing 12.

The present invention is also equally applicable with a built-in plasma cutting system. Such a system may have a built-in supply of compressed air, or may be equipped to receive compressed air from an external source. The built-in supply of compressed air may be a bottle or a compressor. The invention can be used in any welding-type apparatus, and is especially applicable for TIG and/or MIG welding processes. It is also noted that the gas cylinder may contain inert or active gases. Such gases can include, but are not limited to, argon, CO2, oxygen, compressed air, or another suitable gas/mixture suitable for such uses. In general then, the invention is applicable to any of the aforementioned welding-type applications that would benefit from the use of gas bottle.

Therefore, in accordance with one embodiment of the present invention, a welding-type apparatus has a power source constructed to condition and output an electrical signal suitable to welding located in an enclosure. The power source is preferably a light-weight inverter-type power source, an energy storage device, such as a battery, or a combination of the two. The configuration is constructed for ease of transport. In either case, the power source is constructed to produce a welding signal preferably from a 110–120V input, but other inputs are contemplated as well. Such inputs include at least sources ranging from 110V to 575V applications. A gas cylinder is disposed within the enclosure and provides shielding gas to a weld.

In accordance with another embodiment of the present invention, a welder has a power source configured to generate welding-type power and deliver the power to a welding gun in electrical communication therewith. A gas cylinder is disposed within the power source and connected thereto so that the cylinder supplies gas to the welding gun.

In accordance with a further embodiment of the present invention, a method of constructing a welding-type apparatus is disclosed that includes positioning a power source within the apparatus, providing a restraining system to hold a gas cylinder relative to the power source, and forming a housing to enclose both the power source and the restraining system.

In accordance with yet another embodiment of the present invention, a welder-type device has a housing with an opening to allow passage of a gas cylinder therethrough. The welder-type device has a means for supplying welding power and a means for retaining a gas cylinder within the housing.

The present invention has been described in terms of the preferred embodiment, and it is recognized that equivalents, alternatives, and modifications, aside from those expressly stated, are possible and within the scope of the appending claims.

What is claimed is:

1. A welding-type apparatus comprising:
   an enclosure having a carrying handle and sized to be portable;
   a power source having an inverter and constructed to condition and output an electrical signal suitable to welding and located in the enclosure; and
   a gas cylinder disposed within the enclosure and constructed to deliver shielding gas from the gas cylinder upon connection of the gas cylinder to the welding-type apparatus.

2. The welding-type apparatus of claim 1 wherein the power source further comprises an energy storage device connected to the inverter.

3. The welding-type apparatus of claim 1 further comprising a wire feeder constructed to feed a consumable wire to a welding gun and wherein the gas cylinder is constructed to provide a shielding gas to the welding gun.

4. The welding-type apparatus of claim 3 wherein the wire feeder is disposed within the enclosure.

5. The welding-type apparatus of claim 1 further comprising a regulator uninterruptably connected to the gas cylinder and disposed within the enclosure.

6. The welding-type apparatus of claim 1 further comprising a regulator having a valve and a gauge, wherein each is accessible to a user through the enclosure.

7. The welding-type apparatus of claim 1 further comprising a torch constructed to receive gas from the gas cylinder.

8. The welding-type apparatus of claim 1 wherein the enclosure further comprises an opening in the enclosure sized generally equivalent to a dimension of the gas cylinder to provide passage of the gas cylinder therethrough and a door to close the opening.

9. The welding-type apparatus of claim 1 further comprising a restraining system to hold a body of the gas cylinder in place for transport.

10. The welding-type apparatus of claim 1 wherein the gas cylinder is either one of a re-fillable bottle and a disposable bottle.

11. A welder comprising:
    a power source configured to generate welding-type power;
    a welding gun in electrical communication with the power source;
    a first gas path;
    a gas cylinder disposed within the power source and connected to the first gas path and constructed to supply gas to the welding gun; and
    a second gas path extending from the power source and connectable to gas container located remotely from the power source.

12. The welder of claim 11 further comprising a wire feeder constructed to provide consumable wire to the welding gun.

13. The welding-type apparatus of claim 11 wherein the first gas path extends between the gas cylinder and a regulator and is being free of a hand manipulated valve.

14. The welder of claim 11 further comprising a housing positioned about the power source and having an opening constructed to allow passage of the gas cylinder therethrough.

15. The welder of claim 14 further comprising a regulator positioned within the housing and connectable to the gas cylinder, wherein the regulator is positioned to allow adjustment from outside the housing.

16. The welder of claim 14 further comprising an opening in the housing constructed to allow passage of the gas cylinder therethrough and having a cover removably positioned over the opening.

17. The welder of claim 11 wherein the power source is at least one of an inverter and energy storage device constructed to produce a welding signal from a source of power ranging from 110V to 575V.

18. A method of constructing a welding-type apparatus:
    positioning an inverter based-power source with respect to a base;
    providing a restraining system to support a gas cylinder by a body of the gas cylinder relative to the power source;
    forming a housing having a handle to enclose the power source and the restraining system; and
    providing a non-movable adapter constructed to operatively engage the gas cylinder so that connection of the gas cylinder with the non-movable adapter fluidly connects the gas cylinder to the welding-type apparatus and provides gas flow therebetween.

19. The method of claim 18 further comprising providing a regulator being connectable to a gas cylinder within the housing.

20. The method of claim 19 further comprising providing another adapter constructed to connect an external gas cylinder to the power source in addition to the gas cylinder within the housing.

21. The method of claim 19 further comprising providing a valve and a gauge of the regulator outside of the housing.

22. The method of claim 18 wherein the power source further comprises one of an energy storage device and a combination of an inverter and an energy storage device that converts an input signal of 110V–575V into a signal capable of welding.

23. The method of claim 18 further comprising forming an opening in the housing thereby providing access to the restraining system.

24. The method of claim 18 further comprising forming a gas path through the non-movable adapter and vented to atmosphere when the gas cylinder is removed therefrom.

25. A welder-type device comprising:
   a housing having an opening to allow passage of a gas cylinder therethrough, the opening having a shape and a size dimension substantially conforming to a shape and a size dimension of the gas cylinder;
   a means for supplying welding power located in the housing; and
   means for retaining the gas cylinder within the housing.

26. The welder-type device of claim 25 wherein the gas cylinder is disposable.

27. The welder-type device of claim 25 further comprising a means for regulating flow from the gas cylinder located in the housing.

28. The welder-type device of claim 27 further comprising a means for attaching a second gas cylinder located outside the housing.

29. The welder-type device of claim 25 wherein the gas cylinder is aligned with the opening of the housing.

30. The welder-type device of claim 25 wherein the means for supplying welding power is at least one of an inverter, an energy storage device, and a combination of an inverter and an energy storage device.

31. The welder-type device of claim 25 wherein the opening shape and size dimension substantially conforms to a longitudinal shape and size dimension of the gas cylinder.

32. The welder-type device of claim 25 wherein the opening shape and size dimension substantially conforms to an axial shape and size dimension of the gas cylinder.

* * * * *

UNITED STATES PATENT AND TRADEMARK OFFICE
CERTIFICATE OF CORRECTION

PATENT NO.   : 6,977,358 B2                                                                 Page 1 of 1
DATED         : December 20, 2005
INVENTOR(S)  : Albercht et al.

It is certified that error appears in the above-identified patent and that said Letters Patent is hereby corrected as shown below:

<u>Column 6,</u>
Line 29, delete "being".

Signed and Sealed this

Fourth Day of April, 2006

JON W. DUDAS
*Director of the United States Patent and Trademark Office*